United States Patent
Marsh (10) Patent No.: US 6,614,636 B1
(45) Date of Patent: Sep. 2, 2003

(54) INPUT/OUTPUT FILTERING SYSTEM HAVING TRI-MODE OVER-VOLTAGE PROTECTION AND DISCONNECT CIRCUIT FOR AUDIO/VIDEO SYSTEMS

(75) Inventor: Richard N. Marsh, Cool, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 249 days.

(21) Appl. No.: 09/713,099

(22) Filed: Nov. 14, 2000

(51) Int. Cl.[7] .................................................. H02H 3/20
(52) U.S. Cl. ........................ 361/91.1; 361/88; 361/119
(58) Field of Search ............................... 361/38, 39, 42, 361/46, 50, 58, 103, 104, 115, 117–119, 124, 126, 127, 131, 91.1, 88

(56) References Cited

U.S. PATENT DOCUMENTS

| | | |
|---|---|---|
| 4,739,436 A | 4/1988 | Stefani et al. |
| 4,937,722 A * | 6/1990 | Deierlein ..................... 323/285 |
| 5,032,946 A | 7/1991 | Misencik et al. |
| 5,153,806 A | 10/1992 | Corey |
| 5,537,044 A | 7/1996 | Stahl |
| 5,617,288 A | 4/1997 | Zaretsky |
| 5,757,603 A | 5/1998 | Kapp et al. |
| 5,896,265 A | 4/1999 | Glaser et al. |
| 5,914,662 A | 6/1999 | Burleigh |
| 5,978,198 A * | 11/1999 | Packard et al. .............. 361/111 |
| 6,229,682 B1 * | 5/2001 | Mechanic .................... 361/111 |

* cited by examiner

Primary Examiner—Brian Sircus
Assistant Examiner—Isabel Rodriguez
(74) Attorney, Agent, or Firm—LaRiviere, Grubman & Payne, LLP (57) ABSTRACT

An input/output filtering system having a single-phase tri-mode over-voltage protection and disconnect circuit for use with peripheral devices. The system prevents the accidental reversal of the line wire with the neutral wire from adversely affecting at least one peripheral device and the overheating and destruction of MOVs in the over-voltage protection circuit. In the event of a sufficiently high voltage causing excessive heating of the MOVs, the hot line will be disconnected from the peripheral device through the use of fuses placed beside each MOV. An audible alarm indicates that a protection device has absorbed an excessive energy. The system further employs an input filter and a plurality of output filters. Such filtration is applied to that noise which travels through an Internet line as well as through a basic power line.

12 Claims, 2 Drawing Sheets

INPUT/OUTPUT FILTERING SYSTEM HAVING TRI-MODE OVER-VOLTAGE PROTECTION AND DISCONNECT CIRCUIT FOR AUDIO/VIDEO SYSTEMS

TECHNICAL FIELD

The present invention relates to filtering systems having over-voltage protection apparati. More particularly, the present invention relates to filtering systems having over-voltage protection apparati with a circuit breaking feature. Even more particularly, the present invention relates to an input/output filtering system having a tri-modal form of over-voltage protection in an apparatus with corresponding tri-modal disconnect features.

BACKGROUND OF THE INVENTION

The current state of the art electronic components (e.g., both commercial and residential computers and related equipment) accommodate transient voltage surge suppression features for protecting their highly sensitive circuits from over-voltage damage. Most transient voltage surge suppression systems today, in particular, input/output filtering systems for audio/video systems, address only minor fault conditions associated with normal use and cannot handle a major over-voltage condition as would occur during loss of neutral, loss of ground, or repetitive current pulses (e.g., from a lightning strike). Typical voltage surge protection devices comprise a plurality of fault fuses where the input is disconnected from the output. The related art surge suppression systems may involve various metal oxide varistor (MOV) and fuse combinations. MOVs are ceramic materials (e.g., ZnO grains in combination with an amorphous material). MOVs maintain the voltage within a narrow band (i.e., varistor voltage) over a wide current range. During major over-voltage conditions, the MOVs may absorb heat so excessive such that they will rupture or explode, thereby allowing the related electronic equipment to be destroyed.

Some related art surge suppression system patents include:

(1) U.S. Pat. No. 5,153,806 to Corey which teaches a plurality of parallel pairs of MOVs, each pair being in series with a thermal fuse, a pair of parallel resistors, and a capacitor in parallel with a resistor;

(2) U.S. Pat. No. 5,896,265 to Glaser et al. which teaches a surge suppression of radio frequency transmission comprising a solid state discharge device in series with an inductor and a resistor;

(3) U.S. Pat. No. 5,914,662 to Burleigh which teaches a plurality of serially coupled MOV—thermal fuse—resistor combinations, each combination in parallel with one another, and an LCD display;

(4) U.S. Pat. No. 5,388,021 to Stahl which teaches a plurality of MOVs being in parallel with a plurality of resistors and a plurality of inductors, and a plurality of MOVs being in parallel with another;

(5) U.S. Pat. No. 5,757,603 to Kapp et al. which teaches a plurality of silicon avalanche diodes in series with a thermal fuse;

(7) U.S. Pat. No. 4,739,436 to Stefani et al. which teaches two MOVs in combination with a fuse and an indicator light;

(8) U.S. Pat. No. 5,537,044 to Stahl which teaches an MOV serially coupled with a gas tube, an inductor, a parallel resistor-inductor combination, the serial coupling in parallel with another MOV;

(9) U.S. Pat. No. 5,617,288 to Zaretsky which teaches a signal adjuster coupled to parallel resistors in series with an amplifier in series with an MOV; and (10) U.S. Pat. No. 5,8032,946 to Misencik et al. which teaches parallel resistors in series with a thermal fuse with a green indicator light and a red indicator light.

A typical problem associated with these related art inventions is that an electrician may accidentally reverse the line wire and the neutral wire, creating an extremely hazardous situation at the wall receptacle, even if the invention succeeds in disconnecting the circuit to a peripheral device. In addition, the related art patents maintain an inordinately high component count to achieve their purpose of surge suppression. Therefore, a need exists for a circuit apparatus and a method which prevent (1) the hazardous condition occurring at the wall receptacle, arising from accidental reversal of the line wire with the neutral wire, from adversely affecting at least one peripheral device in the line, and (2) the overheating and destruction of MOVs in an over-voltage protection circuit by providing an efficient circuit configuration (i.e., the minimum number of components for device size reduction) which assures a rapid simultaneous disconnect of both the hot line and the neutral line.

BRIEF SUMMARY OF THE INVENTION

An object of the present invention is to provide an apparatus and a method which prevent (1) the hazardous condition occurring at the wall receptacle, arising from accidental reversal of the line wire with the neutral wire, from adversely affecting at least one peripheral device in the line, and (2) the overheating and destruction of MOVs in an over-voltage protection circuit by providing an efficient circuit configuration (i.e., the minimum number of components for device size reduction) which assures a rapid simultaneous disconnect of both the hot line and the neutral line.

Another object of the present invention is to provide an apparatus and a method which prevent (1) the hazardous condition occurring at the wall receptacle, arising from accidental reversal of the line wire with the neutral wire, from adversely affecting at least one peripheral device in the line, and (2) the overheating and destruction of MOVs in an over-voltage protection circuit by opening the circuit to simultaneously disconnect both the hot line and the neutral line feeding a load when the over-voltage event occurs in any of the three following wire pairings: hot line to neutral line (L-N), hot line to ground line (L-G), or neutral line to ground line (N-G).

Yet another object of the present invention is to provide a flexible system for use with audio/video equipment which provides input/output filtering in conjunction with tri-mode over-voltage protection and disconnect.

Accordingly, the present invention provides an input/output filtering system for use with audio/video systems having a tri-mode over-voltage protection and disconnect circuit apparatus for all AC power wires/lines and combinations thereof. The hot line (L), neutral (N), and ground (G) wires are all paths vulnerable to destructive high voltages. In particular, e the present invention provides an apparatus and a method which prevent (1) the hazardous condition occurring at the wall receptacle, arising from accidental reversal of the line wire with the neutral wire, from adversely affecting at least one peripheral device in the line, and (2) the overheating and destruction of MOVs in an over-voltage protection circuit by providing an efficient circuit configuration which assures a rapid simultaneous disconnect of both the hot line and neutral power lines. The present invention achieves this by opening the circuit to simultaneously disconnect both the hot line and the neutral line feeding a load when the over-voltage event occurs in any of three wire pairings: hot line to neutral line (L-N), hot line to ground line (L-G), or neutral line to ground line (N-G).

By example, in a single phase AC power system, the hot line (L), the neutral line (N), and ground line (G) are all paths vulnerable to destructive high voltages. The present invention system maintains an apparatus which protects these paths by first providing protection devices in the form of metal oxide varistors (MOVs) in parallel for each pair of wires (i.e., hot line to neutral, hot line to ground, and neutral to ground). The apparatus additionally comprises in-line fuses and a normally open relay device that disconnects both the hot line as well as the neutral line from the load. The MOV devices are activated by an over-voltage condition and upon absorbing all the extra and potentially damaging power surges and over-voltages which cause excessive current to flow, which then opens the fuse, causing de-energizing of the relay device.

Accordingly, in the event of a sufficiently high voltage (i.e., $V_{L-N}$>120V to 130V), from hot line-to-neutral or hot line-to-ground, causing excessive heating of the MOV protection devices, the hot line and neutral line will be disconnected from the user's connected equipment. This disconnect is facilitated by the use of an open circuit condition of the in-line special fuses which causes de-energizing of the relay device and reversion of the relay contacts back to a normally open condition. Preferably, this is a non-resettable disconnect condition that maintains the relay in its normally open condition, especially where the over-voltage protection circuit is the final protection to the connected equipment for preventing excessive current and heating which, otherwise, would lead to smoke and/or fire. In the preferred embodiment, the relay simultaneously disconnects the hot line as well as the neutral line from the connected peripheral equipment (i.e., the load) such as audio and visual devices.

The current through the line may be denoted by $I_L$. The current through an MOV, $I_{MOV}$, must remain less than the rated current for the MOV, $I_{MOV\text{-}rated}$, in normal operation. During an over-voltage event where the current through the MOV exceeds its current rating (i.e., $I_{MOV}$>$I_{MOV\text{-}rated}$), thereby effecting a current through the thermal fuse greater than its current rating ($I_L$=$I_{TF}$, $I_{TF}$>$I_{TF\text{-}rated}$), such thermal fuse will open, thereby preventing voltage application at the relay, thereby preventing the relay from being energized, and thereby effecting its normally-open contact state (See FIG. 1).

In all the foregoing protection modes (i.e., L-N, L-G, N-G), a warning feature may be provided which indicates that a protection device (e.g., an MOV) has absorbed excessive energy, thereby opening a thermal fuse which effectively opens the path to any protection device. The warning feature may continue to alert the user even if power is no longer applied to the equipment. This warning feature alerts the user of the otherwise potentially destructive event. Upon so alerting the user, the apparatus should be unplugged from the wall outlet and replaced. The warning feature may be audio and/or visual in nature.

The present invention further employs an input filter disposed forward and a plurality of output filters disposed aft of the tri-mode protection apparatus. The input filter slows the rise-time of an incoming transient so that the tri-mode protection device response time is not exceeded and reduces noise in the line. The output filter performs the functions of removing noise which back-creeps into the line from a peripheral device (e.g., radio frequency noise). The present invention further comprises a plurality of MOV-thermal fuse sets disposed between each output filter and peripheral device for individually isolating noise from each peripheral device of a plurality of such devices disposed on a line by subjecting such noise to different filters (e.g., analog, video, digital). Thus, any back-emitted noise is filtered, and thus, highly attenuated, thereby preventing interference among a plurality of peripheral devices on the line. A plurality of isolation transformers may be disposed forward and in series with each output filter and may be electronically coupled with the hot line. Such filtration is applied to that which travels through an Internet line as well as through a basic power line. Other features of the present invention are disclosed, or are apparent in the section entitled "DETAILED DESCRIPTION OF THE INVENTION."

BRIEF DESCRIPTION OF DRAWINGS

For a fuller understanding of the present invention, the accompanying drawings are below-referenced.

Reference numbers refer to the same or equivalent parts of the present invention throughout the several figures of the drawings.

DETAILED DESCRIPTION OF THE INVENTION

Preferred Embodiment of the Apparatus

Figure 1:
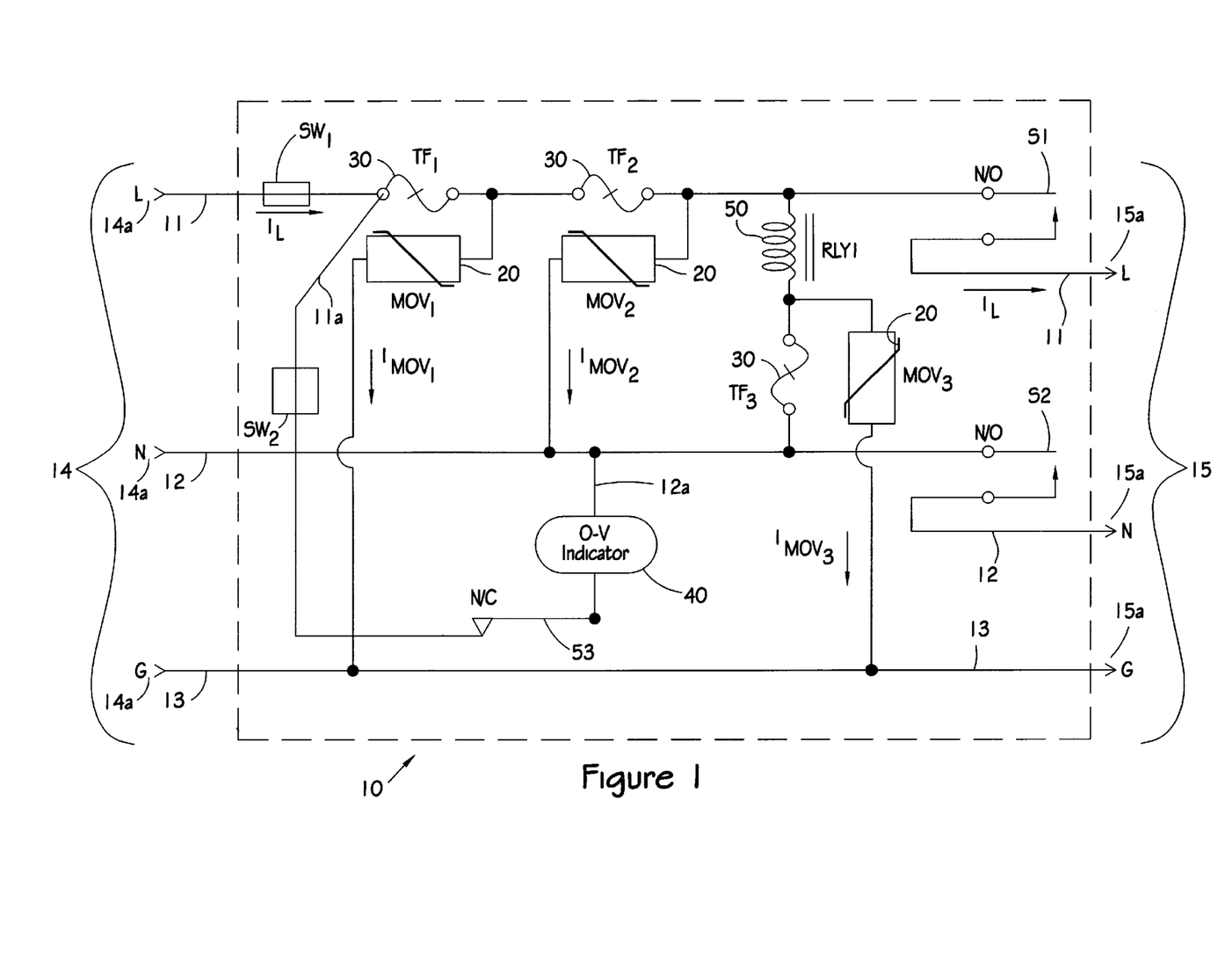
FIG. 1 is a schematic view of a tri-mode over-voltage protection and disconnect circuit apparatus, in accordance with the present invention.

FIG. 1 schematically illustrates the preferred embodiment of a single-phase tri-mode over-voltage protection and disconnect circuit apparatus 10, in accordance with the present invention. By example, the apparatus 10 comprises: an electronic circuit comprising a power input portion 14, having three power input connectors 14a that electrically couple to a hot line 11, a neutral line 12, a ground line 13 disposed internal to the over-voltage protection apparatus. By example, power input portion 14 receives AC power from a single phase power source comprising a 120V AC line voltage measured from line-to-neutral and includes a safety ground line (not shown). Under normal operations during use of the present invention, the circuit lines 11, 12, and 13 electrically couple the AC power source to at least one peripheral device (not shown) via power output portion 15. The power output portion 15, by example, may comprise three power output connectors 15a that distribute AC power via a continuation of hot line (L) 11, neutral line (N) 12, and ground line (G) 13 to a peripheral device. The three power output connectors 15a being electrically coupled with at least one peripheral device. In the preferred embodiment, three protection devices, such as metal oxide varistors (MOVs) 20 absorb any power surges and over-voltages. Each of the three MOVs 20 are disposed between three line pairings, namely hot line 11 to neutral line 12 (L-N), hot line 11 to ground line 13 (L-G), and neutral line 12 to ground line 13 (N-G). The apparatus 10 further comprises three thermal fuses ($TF_1$, $TF_2$, $TF_3$) 30. Fuses $TF_1$, $TF_2$, are disposed in series with the hot line 11, while fuse $TF_3$ being disposed in a parallel leg from the hot line 11 to neutral line 12 and being effectively disposed in series with $MOV_3$ disposed as the over-voltage protection device between the neutral line 12 and the ground line 13. The apparatus 10 further comprises a relay (Rly1) 50 disposed in the same parallel leg where fuse $TF_3$ is disposed such that the voltage between the hot line 11 and the neutral line 12 ($V_{L-N}$) energizes a relay 50 to change its contact's state from a normally- open (N/O) state to a closed contact state. Thus, thermal fuse 30 ($TF_3$) associated with the L-G line pairing, under normal operating conditions, facilitates energizing the relay 50 and distributing line voltage $V_{L-N}$ at the power output portion 15, 15a.

Continuing to refer to FIG. 1, under normal operating condition, the three MOVs 20 devices are high impedance components which facilitate voltage-energizing of the relay 50 and distribution of the line voltage to any connected peripheral equipment through relay contacts (poles) 51 and 52. The current through hot line 11 is denoted by $I_L$. The current through an MOV 20 is denoted as $I_{MOV1}$, $I_{MOV2}$, $I_{MOV3}$, respectively, and must remain less than its rated current, $I_{MOV-rated}$, under normal operation. During an over-voltage event, the particular affected MOV 20 is responsive by a lowering of its impedance such that the current through the device 20 is greater than its current rating (i.e., $I_{MOV} > I_{MOV-rated}$). This effectively results in a current demand through a thermal fuse 30 greater than its current rating ($I_L = I_{TF}$, $I_{TF} > I_{TF-rated}$). Such over-voltage condition causes an affected thermal fuse 30 to open (blow) and, thus, prevents line voltage from being applied at the relay 50, thereby preventing the relay 50 from being energized, and thereby simultaneously returning of its contacts 51, 52 to their normally-open contact state, (see FIG. 1). The opening of the fuse 30 prevents excessive heating of the affected respective one of the three MOVs 20. For safety reasons, the ground line 13 is not disconnected from the ground output G at the output connector 15a. For a neutral to ground over-voltage condition, $MOV_3$ will cause the fuse $TF_3$ to open which also causes de-energizing of the relay 50.

The apparatus 10 may further comprise a warning feature 40 (i.e., an over-voltage indicator) for indicating that at least one of the three MOVs 20 has responded to an over-voltage condition which has effected opening of at least one respective thermal fuse 30. The warning feature 40 comprises at least one warning feature selected from a group of warning features consisting essentially of an audible alarm, an indicator light, and an LED indicator, warning that AC power has been disconnected to the peripheral equipment due to an over-voltage (O-V) condition. As depicted and by example only, the warning feature 40 is energized from the input AC power source via a line 11a that remains hot, independent of fuse 30. Line 11a is connected to a normally-closed (N/C) contact 53 of the relay 50. Thus, the warning feature 40 is only active when the relay 50 is de-energized (i.e., contacts 53 are in a normally-closed state) due to an over-voltage condition. The warning feature 40 may continue alerting the user of the event, even if power is no longer applied to the peripheral device. The apparatus 10 may be disengaged from the power source after alerting by the warning feature 40, and may then be replaced. Apparatus 10 may include ON/OFF switches $Sw_1$, $Sw_2$ for power distribution, and/or for safety considerations.

Example 1 of the Apparatus

A tri-mode over-voltage protection and disconnect circuit apparatus may comprise a first over-voltage protection circuit disposed between a hot line and a ground line; a second over-voltage protection circuit disposed between the hot line and a neutral line; a third over-voltage protection circuit disposed between the neutral line and the ground line; and a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay.

Example 2 of the Apparatus

The apparatus, as described in Example 2 of the Apparatus, may further comprise at least one warning feature for indicating that an over-voltage condition has occurred, the at least one warning feature being selected from a group of warning features consisting essentially of an audible alarm, an indicator light, and an LED indicator.

Example 3 of the Apparatus

In the apparatus, as described in Example 1 of the Apparatus, each of the over-voltage protection circuits may comprise a respective fuse; and a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

Example 4 of the Apparatus

A tri-mode over-voltage protection and disconnect circuit apparatus may comprise a first over-voltage protection circuit disposed between a hot line and a ground line; a second over-voltage protection circuit disposed between the hot line and a neutral line; a third over-voltage protection circuit disposed between the neutral line and the ground line; and a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay; and at least one warning feature for indicating that an over-voltage condition has occurred, the at least one warning feature being selected from a group of warning features consisting essentially of an audible alarm, an indicator light, and an LED indicator.

Example 5 of the Apparatus

In the apparatus, as described in Example 4 of the Apparatus, each of the over-voltage protection circuits may comprise a respective fuse; and a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

Example 6 of the Apparatus

A tri-mode over-voltage protection and disconnect circuit apparatus may comprise a first over-voltage protection circuit disposed between a hot line and a ground line; a second over-voltage protection circuit disposed between the hot line and a neutral line; a third over-voltage protection circuit disposed between the neutral line and the ground line; and a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay, wherein each the over-voltage protection circuit comprises a respective fuse; and a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

Example 7 of the Apparatus

The apparatus, as described in Example 6 of the Apparatus, may further comprise at least one warning feature for indicating that an over-voltage condition has occurred, the at least one warning feature being selected from a group of warning features consisting essentially of an audible alarm, an indicator light, and an LED indicator.

Preferred Embodiment of the System

Figure 2:
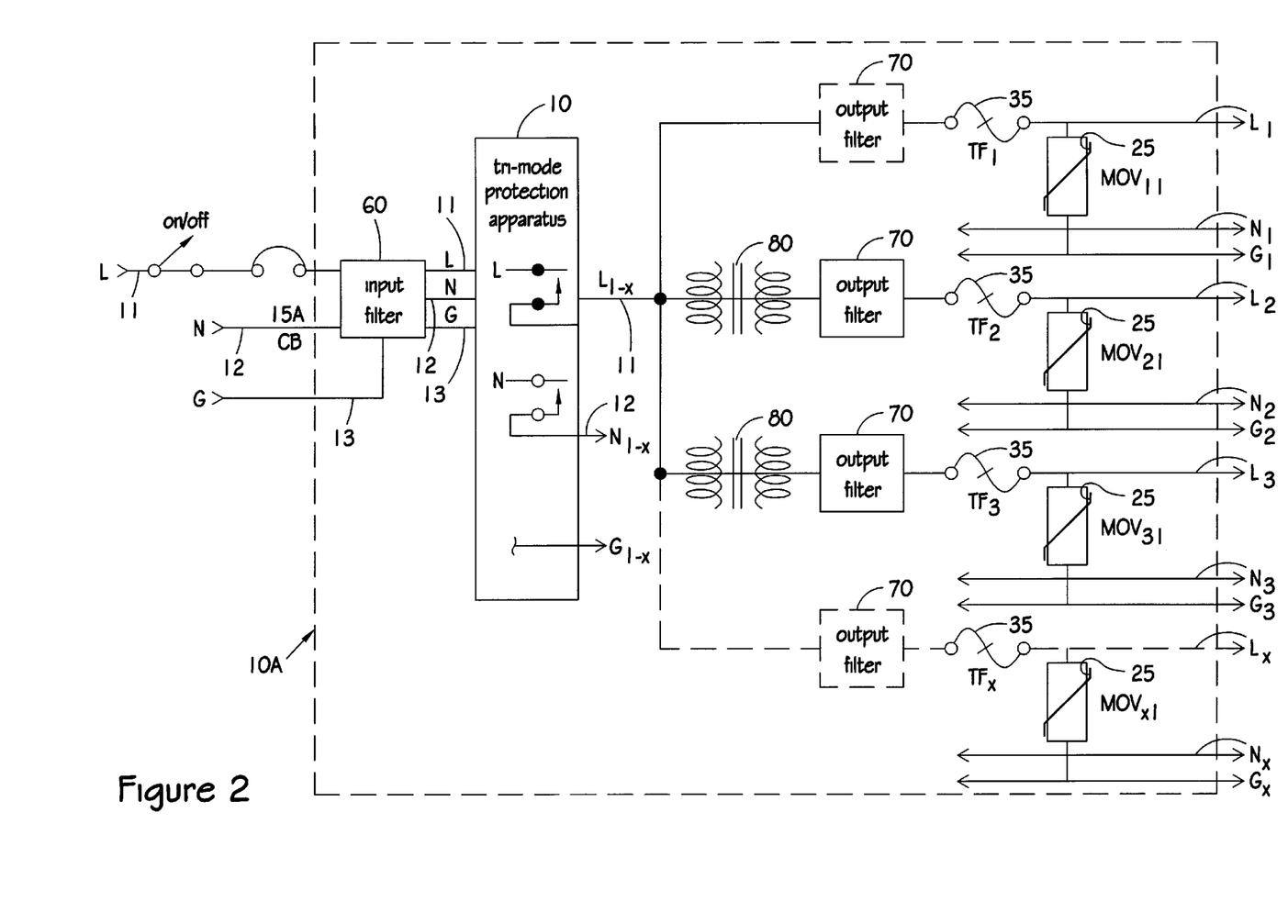
FIG. 2 is a schematic view of an input/output filtering system having a tri-mode over-voltage protection and disconnect circuit apparatus for use with peripheral devices such as audio/video systems, in accordance with the present invention.

FIG. 2 schematically illustrates the input/output filtering system 10A having a tri-mode over-voltage protection and disconnect circuit apparatus 10 for use with peripheral devices such as audio/video systems, in accordance with the present invention. The present invention input/output filtering system 10A, having a tri-mode over-voltage protection and disconnect circuit apparatus 10 (as described in FIG. 1), comprises: an input filter 60; a tri-mode over-voltage protection and disconnect circuit apparatus 10; a plurality of output filters 70, the plurality of output filters 70 being disposed aft of the tri-mode over-voltage protection and disconnect circuit apparatus 10, the hot line 11, the neutral line 12, and the ground line 13 being split among each of the plurality of output filters 70, each of the output filters 70 being electronically coupled with each split hot line $L_1$, $L_2$, $L_3$, . . . , $L_X$, each split neutral line $N_1$, $N_2$, $N_3$, . . . , $N_X$, and each split ground line $G_1$, $G_2$, $G_3$, . . . , $G_X$; a plurality of output thermal fuses 35, each output thermal fuse 35 being electronically coupled with the split hot line $L_1$, $L_2$, $L_2$, $L_1$, . . . , $L_X$, each output thermal fuse 35 being disposed aft of each the output filter 70; a plurality of isolation transformers 80 for attenuating incoming noise, back-emitted noise, and spurious unwanted interference frequencies, each isolation transformer 80 being electronically coupled with each the split hot line $L_1$, $L_2$, $L_3$, . . . , $L_X$, each isolation transformer 80 being disposed forward of each the output filter 70; and a plurality of output MOVs 25, each output MOV 25 being disposed between each split hot line $L_1$, $L_2$, $L_3$, . . . , $L_X$ and each split neutral line $N_1$, $N_2$, $N_3$, . . . , $N_X$.

In the present invention system 10A, the apparatus 10 may further comprise a warning feature 40 for indicating that at least one of the three MOVs 20 has absorbed an excessive energy which has effected opening of at least one respective thermal fuse 30 of the three thermal fuses 30, the warning feature 40 comprising at least one warning feature selected from a group of warning features consisting essentially of an audible alarm, an indicator light, and an LED indicator, thereby disconnecting the circuit 10 (i.e., hot line 11 and neutral line 12, simultaneously) at the relay 50, and thereby closing the circuit to at least one respective MOV 20 of the three MOVs 20. The warning feature 40 may continue alerting the user of the event, even if power is no longer applied to the peripheral device. The apparatus 10 within the system 10A is disengageable from the power source after alerting by the warning feature 40, and may then be replaced. Apparatus 10 may include ON/OFF switches $SW_1$, $SW_2$ for power distribution, and/or for safety considerations.

Example 1 of the System

An input/output filtering system, for protecting at least one peripheral device and a power source, having a tri-mode over-voltage protection and disconnect circuit apparatus may comprise: a tri-mode over-voltage protection and disconnect circuit apparatus; an input filter electronically coupled and disposed between a power source and the apparatus, the power source having a hot line, a neutral line, and a ground line; at least one output filter; at least one isolation transformer; and at least one output over-voltage protection circuit, each of the at least one output over-voltage protection circuit being electronically coupled to the at least one output filter and at least one peripheral device, whereby the tri-mode over-voltage protection and disconnect circuit apparatus, in the event of an over-voltage condition, responds by simultaneously disconnecting the hot line and the neutral line for preventing a hazardous condition at the power source, the hazardous condition arising from an accidental reversal of the hot line wire with the neutral line, and for preventing overheating and destruction of the apparatus, whereby the input filter slows rise-time of an incoming transient such that the apparatus response time is not exceeded and reduces noise in the hot line, whereby the at least one output filter, in conjunction with the at least one isolation transformer, removes back-emitted noise from the at least one peripheral device, and whereby the at least one output over-voltage protection circuit individually isolates back-emitted noise from the at least one peripheral device by subjecting the noise to each the at least one output filter and the at least one isolation transformer, thereby attenuating the noise, and thereby preventing electronic interference among each of the at least one peripheral device.

Example 2 of the System

In the system, as described in Example 1 of the System, the tri-mode over-voltage protection and disconnect circuit apparatus may comprise: a first over-voltage protection circuit disposed between a hot line and a ground line; a second over-voltage protection circuit disposed between the hot line and a neutral line; a third over-voltage protection circuit disposed between the neutral line and the ground line; and a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay.

Example 3 of the System

In the system, as described in Example 2 of the System, the apparatus may also further comprise at least one warning feature for indicating that an over-voltage condition has occurred, the at least one warning feature being selected from a group of warning features consisting essentially of an audible alarm, an indicator light, and an LED indicator.

Example 4 of the System

In the apparatus of the system, as described in Example 3 of the System, each of the over-voltage protection circuits may comprise a respective fuse; and a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

Example 5 of the System

The system, as stated in Example 1 of the System, wherein the apparatus comprises: a first over-voltage protection circuit disposed between a hot line and a ground line; a second over-voltage protection circuit disposed between the hot line and a neutral line; a third over-voltage protection circuit disposed between the neutral line and the ground line; and a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay; at least one warning feature for indicating that an over-voltage condition has occurred, the at least one warning feature being selected from a group of warning features consisting essentially of an audible alarm, an indicator light, and an LED indicator.

Example 6 of the System

The system, as stated in Example 5 of the System, wherein each the over-voltage protection circuit comprises a respective fuse; and a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

Example 7 of the System

The system, as described in Example 1 of the System, wherein the apparatus comprises: a first over-voltage protection circuit disposed between a hot line and a ground line; a second over-voltage protection circuit disposed between the hot line and a neutral line; a third over-voltage protection circuit disposed between the neutral line and the ground line; and a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay, wherein each the over-voltage protection circuit circuit comprises: a respective fuse; and a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

Example 8 of the System

The system, as described in Example 7 of the System, further comprising: at least one warning feature for indicating that an over-voltage condition has occurred, the at least one warning feature being selected from a group of warning features consisting essentially of an audible alarm, an indicator light, and an LED indicator.

Example 9 of the System

The system, as described in Example 1 of the System, wherein the noise arises from a noise source selected from a group of noise sources consisting essentially of an Internet and a basic power line.

Preferred Embodiment of the Apparatus' Method

The preferred method of the present invention comprises protecting a plurality of peripheral devices by providing a tri-mode over-voltage protection and disconnect circuit apparatus 10, in accordance with the present invention. By example, the method comprises the steps of providing an electronic circuit, distributing power under normal operating conditions, disconnecting power distribution to peripheral equipment responsive to an over-voltage condition occurring on any of the three electrical lines in a single phase electrical power system, namely line-to-neutral, line-to-ground and neutral-to-ground, indicating loss of power due to an over-voltage condition, and restoring power to the peripheral equipment by replacing/resetting the fuses of apparatus 10 as required. Apparatus 10 may include providing ON/OFF switches $Sw_1$, $Sw_2$ for power distribution, and/or for safety considerations.

Example 1 of the Apparatus' Method

An example of the present invention method of protecting at least one peripheral device from an over-voltage conditions comprises: providing a tri-mode over-voltage protection and disconnect circuit apparatus, the apparatus comprising a first over-voltage protection circuit disposed between a hot line and a ground line, a second over-voltage protection circuit disposed between the hot line and a neutral line, a third over-voltage protection circuit disposed between the neutral line and the ground line, and a relay disposed between the hot line and the neutral line, the relay having at least two normally open sets of contacts being electrically coupled to the hot line and the neutral line, respectively, the apparatus providing AC power to the at least one peripheral device, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay; responding to an over-voltage condition, the responding step being activated by at least one of the provided over-voltage protection circuits, thereby de-energizing the relay; and further responding to the over-voltage condition by disconnecting a voltage energizing the relay, thereby simultaneously causing the normally open state.

Example 2 of the Apparatus' Method

The method, as described in Example 1 of the Apparatus' Method, may further comprise providing at least one warning feature for indicating that an over-voltage condition has occurred, the at least one warning feature being selected from a group of warning features consisting essentially of an audible alarm, an indicator light, and an LED indicator; and warning that an over-voltage condition has occurred by activating the provided warning feature.

Preferred Embodiment of the System's Method

A preferred method of protecting a plurality of peripheral devices by providing an input/output filtering system 10A, having a tri-mode over-voltage protection and disconnect circuit apparatus 10, in accordance with the present invention. The method of protecting audio/video systems by providing an input/output filtering system 10A for use with audio/video systems having a tri-mode over-voltage protection and disconnect circuit apparatus 10 (as described in FIG. 1) comprises the steps of: providing an input filter 60; providing a tri-mode over-voltage protection and disconnect circuit apparatus 10; providing a plurality of output filters 70, the plurality of output filters 70 being disposed aft of the tri-mode over-voltage protection and disconnect circuit apparatus 10, the line wire 11 and the neutral wire 12 being split among each of the plurality of output filters 70, each of the output filters 70 being in electronic connection with each the split line wire $L_1, L_2, L_3, \ldots, L_x$ and each the split neutral wire $N_1, N_2, N_3, \ldots, N_x$; providing a plurality of output thermal fuses 35, each of the plurality of output thermal fuses 35 being in electronic connection with the split line wire $L_1, L_2, L_3, \ldots, L_x$ each of the plurality of output thermal fuses 35 being disposed aft of each the output filter 70; providing a plurality of isolation transformers 80 for attenuating incoming noise, back-emitted noise, and spurious unwanted interference frequencies, each of the plurality of isolation transformers 80 being electronically coupled with each the split line wire $L_1, L_2, L_3, \ldots, L_x$, each of the plurality of isolation transformers 80 being disposed forward of each the output filter 70; and providing a plurality of output MOVs 25, each the output MOV 25 being disposed between each the split line wire $L_1, L_2, L_3, \ldots, L_x$ and each the split neutral wire $N_1, N_2, N_3, \ldots, N_x$.

The system's method may further comprise the optional step of providing a warning feature 40 for indicating that at least one of the three MOVs 20 has absorbed an excessive energy, thereby effecting opening of at least one respective thermal fuse 30 of the three thermal fuses 30, thereby disconnecting the circuit 10 (i.e., line wire 11 and neutral wire 12, simultaneously) at the relay 50, and thereby closing the circuit 10 to at least one respective MOV 20 of the three MOVs 20. The method may further include continuously alerting the user of the event with the warning feature 40, even if power is no longer applied to the peripheral device. The method may further comprise the steps of disengaging the system 10A from the power source 14a; and replacing the system 10A. Apparatus 10 may include providing ON/OFF switches $Sw_1, Sw_2$ for power distribution, and/or for safety considerations.

Example 1 of the System's Method

A system method of protecting at least one peripheral device and a power source by providing an input/output filtering system having a tri-mode over-voltage protection and disconnect circuit apparatus, may comprise: providing a tri-mode over-voltage protection and disconnect circuit apparatus; providing an input filter electronically coupled and disposed between a power source and the apparatus, the power source having a hot line, a neutral line, and a ground line; providing at least one output filter; providing at least one isolation transformer; and providing at least one output over-voltage protection circuit, each of the at least one output over-voltage protection circuit being electronically coupled to the at least one output filter and at least one peripheral device, whereby the tri-mode over-voltage protection and disconnect circuit apparatus, in the event of an over-voltage condition, responds by simultaneously disconnecting the hot line and the neutral line for preventing a hazardous condition at the power source, the hazardous condition arising from an accidental reversal of the hot line wire with the neutral line, and for preventing overheating and destruction of the apparatus, whereby the input filter slows rise-time of an incoming transient such that the apparatus response time is not exceeded and reduces noise in the hot line, whereby the at least one output filter, in conjunction with the at least one isolation transformer, removes back emitted noise from the at least one peripheral device, and whereby the at least one output over-voltage protection circuit individually isolates back-emitted noise from the at least one peripheral device by subjecting the noise to each the at least one output filter and each at least one isolation transformer, thereby attenuating the noise, and thereby preventing electronic interference among each of the at least one peripheral device.

Example 2 of the System's Method

The system's method, as described in Example 1 of the System's Method, wherein the apparatus provides the protection by an apparatus method comprising: providing a tri-mode over-voltage protection and disconnect circuit apparatus, the apparatus comprising a first over-voltage protection circuit disposed between a hot line and a ground line; a second over-voltage protection circuit disposed between the hot line and a neutral line; a third over-voltage protection circuit disposed between the neutral line and the ground line; and a relay disposed between the hot line and the neutral line, the relay having at least two normally open sets of contacts being electrically coupled to the hot line and the neutral line, respectively, the apparatus providing AC power to the at least one peripheral device, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay; responding to an over-voltage condition, the responding step being activated by at least one of the provided over-voltage protection circuits, thereby de-energizing the relay; and further responding to the over-voltage condition by disconnecting a voltage energizing the relay, thereby simultaneously causing the normally open state.

Example 3 of the System's Method

The system method, as described in Example 2 of the System's Method, wherein the apparatus method further comprises: providing at least one warning feature for indicating that an over-voltage condition has occurred, the at least one warning feature being selected from a group of warning features consisting essentially of an audible alarm, an indicator light, and an LED indicator; and warning that an over-voltage condition has occurred by activating the provided warning feature.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims. Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, it should be readily apparent to those of ordinary skill in the art that various changes and modifications in form, semiconductor material, and fabrication material detail may be made without departing from the spirit and scope of the inventions as set forth in the appended claims. No claim herein is to be construed under the provisions of 35 U.S.C. 112, sixth paragraph, unless the element is expressly recited using the phrase "means for."

What is claimed:

1. An input/output filtering system, for protecting at least one peripheral device and a power source, having a tri-mode over-voltage protection and disconnect circuit apparatus, the system comprising:

A. a tri-mode over-voltage protection and disconnect circuit apparatus;

B. an input filter electronically coupled and disposed between a power source and the apparatus, the power source having a hot line, a neutral line, and a ground line;

C. at least one output filter;

D. at least one isolation transformer, each isolation transformer being electronically coupled to the hot line and to each output filter, each isolation transformer being disposed forward of each output filter; and E. at least one output over-voltage protection circuit, each of the at least one output over-voltage protection circuit being electronically coupled to the at least one output filter and at least one peripheral device, whereby, in the event of an over-voltage condition, at least one of a first, second, and third over-voltage protection circuits responds by disconnecting a voltage energizing a relay, thereby simultaneously causing the normally open state such that the hot line and the neutral line are not distributed as an output voltage, whereby the input filter slows rise-time of an incoming transient such that the apparatus response time is not exceeded and reduces noise in the hot line, whereby the at least one output filter, in conjunction with the at least one isolation transformer, removes incoming noise from the power source, back-emitted noise from the at least one peripheral device, and spurious unwanted frequencies, and whereby the at least one output over-voltage protection circuit individually isolates back-emitted noise from the at least one peripheral device by subjecting the noise to each the at least one output filter, thereby attenuating the noise, and thereby preventing electronic interference among each of the at least one peripheral device.

2. The system, as recited in claim 1, wherein the tri-mode over-voltage protection and disconnect circuit apparatus comprises:

a. a first over-voltage protection circuit disposed between a hot line and a ground line;

b. a second over-voltage protection circuit disposed between the hot line and a neutral line;

c. a third over-voltage protection circuit disposed between the neutral line and the ground line; and d. a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits responds by disconnecting a voltage energizing the relay, thereby simultaneously causing the normally open state such that the hot line and the neutral line are not distributed as an output voltage.

3. The system, as recited in claim 2, wherein the apparatus further comprises:

e. at least one warning feature for indicating that an over-voltage condition has occurred, the at least one warning feature being selected from a group of warning features consisting essentially of:
      (1) an audible alarm,
      (2) an indicator light, and
      (3) an LED indicator.

4. The system, as recited in claim 2, wherein each of the over-voltage protection circuits comprises:

a. a respective fuse; and b. a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

5. The system, as recited in claim 1, wherein the apparatus comprises:

a. a first over-voltage protection circuit disposed between a hot line and a ground line;

b. a second over-voltage protection circuit disposed between the hot line and a neutral line;

c. a third over-voltage protection circuit disposed between the neutral line and the ground line; and d. a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits responds by disconnecting a voltage energizing the relay, thereby simultaneously causing the normally open state such that the hot line and the neutral line are not distributed as an output voltage;

e. at least one warning feature for indicating that an over-voltage condition has occurred, the at least one warning feature being selected from a group of warning features consisting essentially of:
(1) an audible alarm,
(2) an indicator light, and
(3) an LED indicator.

6. The system, as recited in claim 5, wherein each of the over-voltage protection circuits comprises:

a. a respective fuse; and b. a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

7. The system, as recited in claim 1 wherein the apparatus comprises:

a. a first over-voltage protection circuit disposed between a hot line and a ground line;

b. a second over-voltage protection circuit disposed between the hot line and a neutral line;

c. a third over-voltage protection circuit disposed between the neutral line and the ground line; and d. a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, whereby, in the event of an over-voltage condition, at least one of the first, second, and third over-voltage protection circuits responds by disconnecting a voltage energizing the relay, thereby simultaneously causing the normally open state such that the hot line and the neutral line are not distributed as an output voltage, wherein each of the over-voltage protection circuits comprises:

a. a respective fuse; and b. a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

8. The system, as recited in claim 7, further comprising:

e. at least one warning feature for indicating that an over-voltage condition has occurred, the at least one warning feature being selected from a group of warning features consisting essentially of:
(1) an audible alarm,
(2) an indicator light, and
(3) an LED indicator.

9. The system, as recited in claim 1, wherein the noise arises from a noise source selected from a group of noise sources consisting essentially of an Internet and a basic power line.

10. A system method of protecting at least one peripheral device and a power source by providing an input/output filtering system having a tri-mode over-voltage protection and disconnect circuit apparatus, the system method comprising:

A. providing a tri-mode over-voltage protection and disconnect circuit apparatus;

B. providing an input filter electronically coupled and disposed between a power source and the apparatus, the power source having a hot line, a neutral line, and a ground line;

C. providing at least one output filter; and

D. providing at least one isolation transformer, each isolation transformer being electronically coupled to the hot line and to each output filter, each isolation transformer being disposed forward of each output filter; and E. providing at least one output over-voltage protection circuit, each of the at least one output over-voltage protection circuit being electronically coupled to the at least one output filter and at least one peripheral device, whereby, in the event of an over-voltage condition, at least one of the first, second, and third over-voltage protection circuits responds by disconnecting a voltage energizing the relay, thereby simultaneously causing the normally open state such that the hot line and the neutral line are not distributed as an output voltage, whereby the input filter slows rise-time of an incoming transient such that the apparatus response time is not exceeded and reduces noise in the hot line, whereby the at least one output filter, in conjunction with the at least one isolation transformer, removes incoming noise from the power source, back-emitted noise from the at least one peripheral device, and spurious unwanted frequencies, and whereby the at least one output over-voltage protection circuit individually isolates back-emitted noise from the at least one peripheral device by subjecting the noise to each the at least one output filter, thereby attenuating the noise, and thereby preventing electronic interference among each of the at least one peripheral device.

11. The system method, as recited in claim 10, wherein the apparatus provides the protection by an apparatus method comprising:

A. providing a tri-mode over-voltage protection and disconnect circuit apparatus, the apparatus comprising:
  a. a first over-voltage protection circuit disposed between a hot line and a ground line;
  b. a second over-voltage protection circuit disposed between the hot line and a neutral line;
  c. a third over-voltage protection circuit disposed between the neutral line and the ground line; and
  d. a relay disposed between the hot line and the neutral line, the relay having at least two normally open sets of contacts being electrically coupled to the hot line and the neutral line, respectively,
    the apparatus providing AC power to the at least one peripheral device, whereby the hot line and the neutral line are not distributed as an output voltage when the sets of contacts are in a normally open state when the relay is de-energized,
    whereby the hot line and the neutral line are distributed as an output voltage when the sets of contacts are in a closed state when the relay is energized, and
    whereby, in the event of an over-voltage condition, at least one of the first, second, and third over-voltage protection circuits responds by disconnecting a voltage energizing the relay, thereby simultaneously causing the normally open state such that the hot line and the neutral line are not distributed as an output voltage, B. responding to an over-voltage condition, the responding step being activated by at least one of the provided over-voltage protection circuits, thereby de-energizing the relay; and C. further responding to the over-voltage condition by disconnecting a voltage energizing the relay, thereby simultaneously causing the normally open state.

12. The system method, as recited in claim 11, wherein the apparatus method further comprises:

D. providing at least one warning feature for indicating that an over-voltage condition has occurred, the at least one warning feature being selected from a group of warning features consisting essentially of:
  (1) an audible alarm,
  (2) an indicator light, and
  (3) an LED indicator; and E. warning that an over-voltage condition has occurred by activating the provided warning feature.

* * * * *